United States Patent [19]

Jansson et al.

[11] Patent Number: 5,680,920
[45] Date of Patent: Oct. 28, 1997

[54] CENTRIFUGAL CLUTCH

[75] Inventors: Hans Jansson; Mikael Ganhammar, both of Huskvarna; Bruno Erdmanis, Jönköping, all of Sweden

[73] Assignee: Aktiebolatet Electrolux, Stockholm, Sweden

[21] Appl. No.: 599,920

[22] Filed: Feb. 12, 1996

[30] Foreign Application Priority Data

| Mar. 17, 1995 | [SE] | Sweden | 9500953 |
| Mar. 17, 1995 | [SE] | Sweden | 9500955 |

[51] Int. Cl.$^6$ ............................ F16D 43/18; F16D 13/16
[52] U.S. Cl. ............................ 192/105 BA; 192/30 V; 192/76
[58] Field of Search ............................ 192/105 BA, 76, 192/30 V; 188/185

[56] References Cited

U.S. PATENT DOCUMENTS

| Re. 19,110 | 3/1934 | Bethenod et al. | 192/105 BA |
| 2,382,228 | 8/1945 | Howell | 188/185 |
| 2,400,585 | 5/1946 | Wolff | 192/105 BA X |
| 2,720,300 | 10/1955 | Muhlbeyer | |
| 2,730,219 | 1/1956 | Kitto | 192/105 BA |
| 3,610,382 | 10/1971 | Makinson | 192/105 BA |
| 3,696,901 | 10/1972 | Henry | 192/105 BA |
| 3,970,178 | 7/1976 | Densow | 192/105 BA |
| 4,029,187 | 6/1977 | Davis et al. | |
| 4,625,849 | 12/1986 | Gommel | 192/105 BA |
| 5,419,421 | 5/1995 | Lohr | 192/105 BA |
| 5,437,356 | 8/1995 | Lohr | 192/105 BA |
| 5,445,250 | 8/1995 | Koschinat | 192/76 X |

*Primary Examiner*—Rodney H. Bonck
*Attorney, Agent, or Firm*—Pearne, Gordon, McCoy & Granger LLP

[57] ABSTRACT

A centrifugal clutch for a power-drive working tool, such as a chain saw, includes a hub (10) adapted to be operatively connected to a drive shaft of an engine, and at least two clutch shoes (13) operatively connected to the hub and radially movable in order to, when actuated by centrifugal force, engage a clutch drum radially surrounding the shoes against the action of a resilient member (16) striving to disengage the shoes from the drum. Each of the clutch shoes is slidably connected to a spoke (12) made integral with the hub. Each of the spokes has a cross-section including two integral, laterally-displaced rectangular portions (12a, 12b). Each spoke is slidably received in a complementary recess formed in a clutch shoe, whereby mutual lateral guiding of the spoke and the clutch shoe is insured.

16 Claims, 1 Drawing Sheet

CENTRIFUGAL CLUTCH

BACKGROUND OF THE INVENTION

1. Field of the Invention

The present invention relates to a centrifugal clutch for a power-driven work-tool, such as a chain saw.

2. Description of Related Art

Typically, a work-tool has a hub operatively connected to a drive shaft of an engine, and at least two clutch shoes connected to the hub. The clutch shoes are radially movable in order to, when actuated by centrifugal force, engage a clutch drum surrounding the shoes.

A resilient means biases the clutch shoes to a position disengaged from the clutch drum. The centrifugal force on the clutch shoes created by rotation of the hub overcomes the biasing force of the resilient means and causes the clutch shoes to move radially into engagement with the clutch drum. The hub integrally includes at least two spokes, and each of the clutch shoes is connected to one of the spokes. The clutch drum is operatively connected to a driven implement or tool, for example a saw chain, and engagement/disengagement between the clutch shoes and the clutch drum operatively couples/decouples the driven tool to the drive (i.e., the engine drive shaft).

A centrifugal clutch of the aforementioned type generally functions to maintain the clutch shoes disengaged from the clutch drum, which keeps the driven tool decoupled from the drive and, thus, stationary when the engine is operating at idle speed. The clutch couples or operatively connects the drive to the driven tool when the engine is running at a higher speed. In order to provide the coupling/decoupling function, the spring or biasing force of the resilient means is adjusted so as to hold the clutch shoes in a retracted position at idling speed and, when the speed increases, the centrifugal force overcomes the spring force and the shoes are thrown out towards the clutch drum to effectively couple the clutch drum (and associated driven tool) to the rotating hub and thereby cause the drum to rotate with the hub and clutch shoes.

Centrifugal clutches of the aforementioned type suffer from the disadvantage that they lack means to guide lateral movement of the clutch shoe relative to its associated spoke. It has been proposed that guide means such as washers, spring clips, or the like, could be used. However, the use of such guide means creates certain drawbacks, in the form of cost and labor incurred by the manufacture and assembly thereof. In addition, it has appeared difficult to obtain sufficiently accurate guiding of the clutch shoes by such guide means.

SUMMARY OF THE INVENTION

It is an object of the present invention to avoid the drawbacks present in the art by eliminating the need for special washers or spring clips for lateral guiding of a clutch shoe. Another object of the present invention is to provide an improved lateral guiding of a clutch shoe as it moves between a retracted position disengaged from the clutch drum to an extended position engaged with the clutch drum.

In accordance with the present invention, a centrifugal clutch includes a hub operatively connected to an engine drive shaft and a clutch drum radially surrounding the hub. The hub integrally includes spokes to which clutch shoes are mounted. Each of the spokes has a cross-section comprising two integral, laterally displaced, rectangular portions.

In further accordance with the present invention, the laterally displaced portions of the spokes are slidably received in a complementary recess in a clutch shoe. Receipt of the laterally displaced, rectangular portions within the complementary recess insures mutual lateral guiding of the spoke and the clutch shoe as the clutch shoe moves between a position disengaged from the clutch drum and a position in engaged with the clutch drum.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
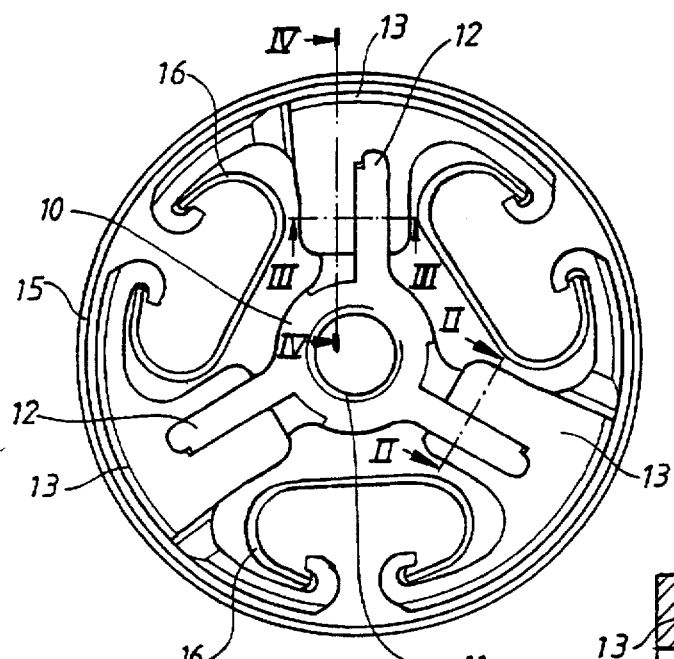
FIG. 1 is a plan view of a centrifugal clutch according to the present invention.

It should be noted that in the detailed description which follows, identical components have the same reference numeral, regardless of whether they are shown in different embodiments of the present invention. It should also be noted that, in order to clearly and concisely disclose the present invention, the drawings may not necessarily be to scale and certain features of the invention may be shown in somewhat schematic form.

The centrifugal clutch shown in the drawings comprises a hub 10 adapted to be attached to an engine drive shaft (not shown) and, to this end, is provided with a tapped bore 11. The preferred and illustrated hub 10 has three radially extending spokes 12, each of which support a radially slidable clutch shoe 13. Naturally, the preferred arrangement of three spokes 12 and three clutch shoes 13 could be replaced with more spokes 12 (i.e., four, five, etc.) or less spokes 12 (i.e., two) without departing from the scope and spirit of the present invention.

The clutch shoes 13 have arc-shaped friction faces adapted to engage a surrounding clutch drum 15 when actuated by centrifugal force resulting from rotation of the hub 10 on the drive shaft. Each end of the shoes 13 includes an attachment lug for tension springs, which preferably comprise C-shaped leaf springs 16, as illustrated.

The C-shaped leaf springs 16 are attached to adjacent ends of the shoes 13 and thereby resiliently connect the shoes 13 to one another. The springs 16 serve to maintain or bias the shoes to a disengaged position spaced from the drum 15.

Figure 2:
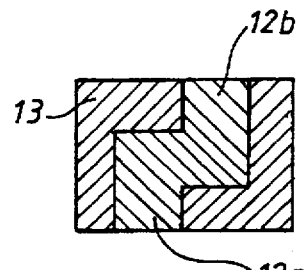
FIG. 2 is an enlarged cross-sectional view as seen along line II—II of FIG. 1, and illustrates a first preferred embodiment of the present invention.

With reference to FIG. 2, each hub spoke 12 has a Z-shaped cross-section including two integral, laterally displaced, oppositely-directed rectangular portions 12a, 12b. Each clutch shoe 13 has a recess of a complementary shape which receives the rectangular portions 12a, 12b of the spoke 12 in a suitable fit. More specifically, the clutch shoe recess is generally Z-shaped in cross section, and opens on a top and bottom surface of the shoe 13 at relatively laterally displaced locations corresponding to the lateral displacement of the rectangular portions 12a, 12b.

As will be apparent to one skilled in the art, the connection between the spoke 12 and the clutch shoe 13 generally permits sliding movement of the shoe 13 in a radial direction relative to the hub 10 (i.e., along the length of the spoke 12), while preventing lateral movement, or movement in a direction other than the radial direction. As such, the connection between the spokes 12 and the clutch shoes 13 may be characterized as a dovetail-type connection or a keyed-type connection.

Inner surfaces of the clutch shoe 13 surrounding and defining the complementary recess engage the outer surfaces of the spoke portions 12a, 12b, and thereby cooperate with the spoke portions 12a, 12b to provide improved lateral guiding of the shoe 13. The connection or cooperation between the spoke 12 and the clutch shoe 13 eliminates the need for any special guide means in the form of washers, spring clips, or the like.

Advantageously, with the illustrated first preferred embodiment of the present invention, the hub 10 and clutch shoes 13 are well suited to be manufactured of sintered metal. The manufacture and assembly of the centrifugal clutch has thereby been simplified, in addition to the fact that the performance has been improved.

A second embodiment of the centrifugal clutch according to the present invention is shown in FIGS. 3–7. In the second embodiment, a damping spring 17 is resiliently secured to the spoke 12 and disposed between mutual supporting surfaces of the spoke 12 and the clutch shoe 13. The location or position of the damping spring 17 is shown best in FIGS. 3 and 4.

Figure 4:
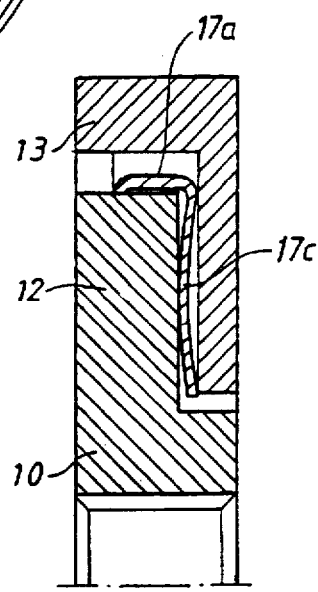
FIG. 4 is an enlarged cross-sectional view as seen along line IV—IV in FIG. 1, and further illustrates the second embodiment of the present invention.
Figure 3:
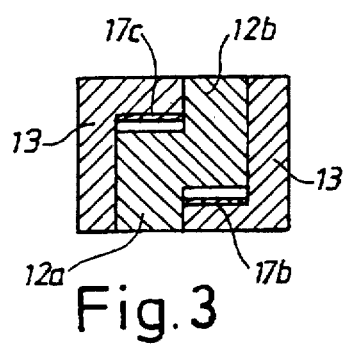
FIG. 3 is an enlarged cross-sectional view as seen along line III—III of FIG. 1, and illustrates a second preferred embodiment of the present invention.

As is clearly illustrated in FIGS. 3 and 4, the complementary recess in the clutch shoe 13, which receives the hub spoke 12, is somewhat enlarged as compared to that of the first embodiment shown in FIG. 2. Enlargement of the recess provides a suitable gap between the surfaces of the spoke portions 12a, 12b and the clutch shoe 13 to accommodate the spring 17.

Figure 5:
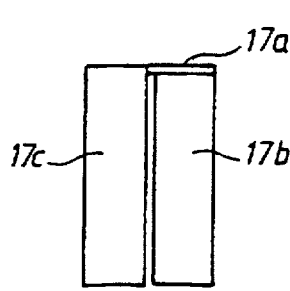
FIG. 5 is an enlarged front elevational view of a damping spring according to the second embodiment of the present invention.
Figure 6:
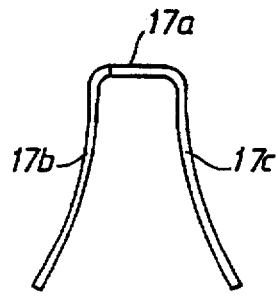
FIG. 6 is an enlarged elevational view of the damping spring, as viewed from a left side of FIG. 5; and, FIG. 7 is an enlarged top plan view of the spring shown in FIGS. 5 and 6.
Figure 7:
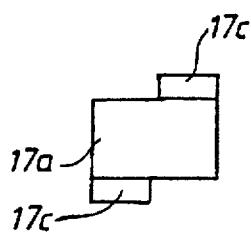

As shown best in FIGS. 5–7, the spring is U-shaped, and includes an intermediate portion 17a and two lateral legs 17b, 17c. The shape of the intermediate portion 17a conforms with the cross-section of the spoke 12 (FIG. 7). The legs 17b, 17c extend along opposite sides of the spoke 12, as shown in FIG. 3.

The spring 17 damps or inhibits lateral movement of the clutch shoe 13 relative to the hub 10 and the spoke 12. Damping relative lateral movement between the clutch shoes 13 and the spokes 12 reduces the load on the clutch shoes and spokes, and the resulting wear of these parts.

While the preferred embodiment of the present invention is shown and described herein, it is to be understood that the same is not so limited but shall cover and include any and all modifications thereof which fall within the purview of the invention.

What is claimed is:

1. A centrifugal clutch for a power-driven work-tool, comprising:

a hub integrally including at least two spokes and being operatively connected to a drive shaft, a clutch drum radially surrounding said hub, and at least two clutch shoes, each of said at least two clutch shoes being operatively connected to one of said at least two spokes and disposed between said hub and said clutch drum, said clutch shoes being biased to a position disengaged from the clutch drum by a resilient biasing means, said clutch shoes being operable to move under the influence of a centrifugal force against the bias of said biasing means and into engagement with said clutch drum, each of said clutch shoes being slidably connected to one of said spokes, wherein each spoke has a central axis radially extending from said hub and a cross-section, in a plane perpendicular to said central axis of said spoke, comprising two integral, laterally-displaced portions and each clutch shoe defines a complementary recess which slidably receives said portions, said portions cooperating with said clutch shoe to ensure mutual lateral guiding of the spoke and the clutch shoe.

2. A centrifugal clutch according to claim 1, wherein said portions are rectangular.

3. A centrifugal clutch according to claim 2, wherein the resilient means comprise springs attached between adjacent ends of the clutch shoes.

4. A centrifugal clutch according to claim 3, wherein the resilient biasing means comprise tension springs attached between adjacent ends of the clutch shoes.

5. A centrifugal clutch according to claim 4, wherein the tension springs are C-shaped leaf springs.

6. A centrifugal clutch according to claim 1, further comprising at least two damping springs, each of said springs being disposed within said complementary recess and relatively between mutual cooperating support surfaces of the clutch shoe and the spoke.

7. A centrifugal clutch according to claim 6, wherein the damping springs comprise U-shaped leaf springs having legs, which extend along opposed sides of the spokes.

8. A centrifugal clutch according to claim 6, wherein said portions are rectangular.

9. A centrifugal clutch according to claim 8, wherein the resilient means comprise springs attached between adjacent ends of the clutch shoes.

10. A centrifugal clutch according to claim 9, wherein the resilient biasing means comprise tension springs attached between adjacent ends of the clutch shoes.

11. A centrifugal clutch according to claim 10, wherein the tension springs are C-shaped leaf springs.

12. A centrifugal clutch according to claim 1, wherein said cross-section is generally Z-shaped.

13. A centrifugal clutch according to claim 1, wherein said hub has a central axis and said portions of said cross-section are laterally-displaced in a direction substantially parallel to said central axis of said hub.

14. A centrifugal clutch according to claim 1, wherein said portions cooperate with said clutch shoe to ensure mutual guiding of the spoke and the clutch shoe in each lateral direction.

15. A centrifugal clutch according to claim 1, wherein said portions cooperate with said clutch shoe to allow movement of said clutch shoe in a radial direction and prevent movement of said clutch shoe in each lateral direction.

16. A centrifugal clutch according to claim 1, wherein a connection between said spoke and said clutch shoe is a keyed-type connection.

* * * * *